Patented Nov. 14, 1939

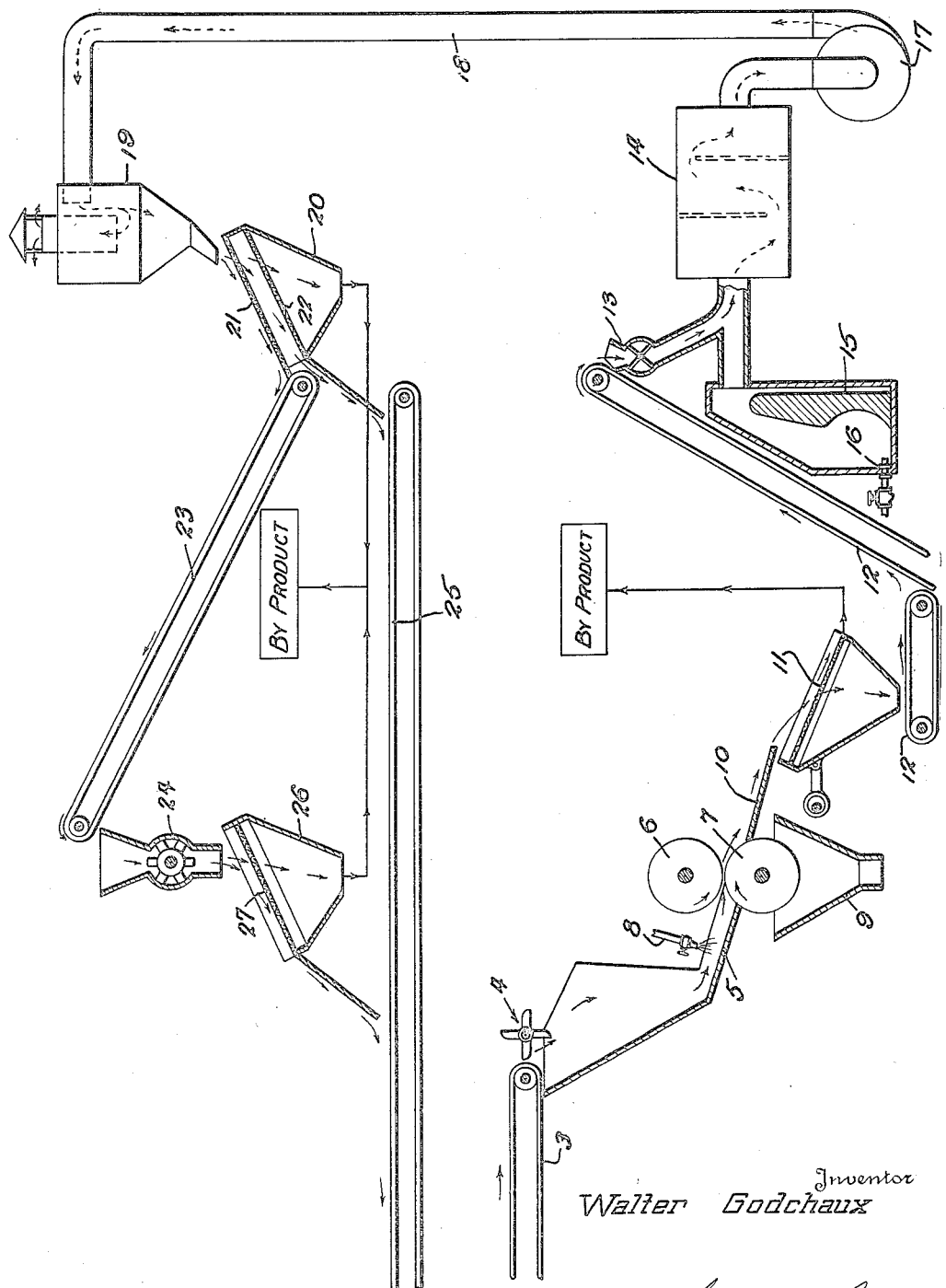

2,179,591

UNITED STATES PATENT OFFICE 2,179,591

POULTRY LITTER AND ANIMAL BEDDING

Walter Godchaux, New Orleans, La., assignor to Godchaux Sugars, Inc., New Orleans, La., a corporation of Louisiana Application June 14, 1938, Serial No. 213,684

16 Claims. (Cl. 119—1)

This application is a continuation-in-part of my application Serial No. 50,613, filed November 19, 1935, for "Poultry litter and animal bedding."

The subject matter of this application relates generally to bedding material for poultry and animals; and more particularly, to a poultry litter and animal bedding derived from bagasse.

The main object of the invention is to provide a bedding material consisting of a dry, loose, bulky, absorbent mass of selected sugar cane pulp, derived from bagasse, and containing exploded pith of sugar cane, and in which the specific gravity of the pith in the finished product is materially less than the specific gravity of the said pith in the sugar cane stalk.

Other objects of the invention will become apparent as the detailed description thereof proceeds.

In the drawing:

The single figure of the drawing is a diagrammatic lay-out of apparatus illustrating the process involved in the manufacture of the poultry litter and animal bedding forming the subject matter of this application.

As shown in the drawing, the sugar cane stalks are fed by a conveyor 3 through revolving knife blades 4 to a chute 5 leading to the expressor or mill rolls 6 and 7. The stalks are reduced by the knife blades 4 to relatively small lengths.

The chute 5 conducts these relatively small lengths of cane to expressors or mill rolls 6 and 7; and this mass during its passage along the chute 5 is subjected to the action of water sprays projected through a valve controlled nozzle 8.

The expressors 6 and 7, which may be multiplied indefinitely, are used to extract the sugar cane juices and solubles by maceration, imbibition, diffusion, or pressure, or any combination of these processes, to remove the greater part of the moisture from the sugar cane mass fed to the expressors. A discharge hopper 9 conducts the extracted juices and solubles away from the apparatus to be used for other purposes.

The bagasse emerging from the expressor mill contains everything except the cane juice that has been previously extracted and has a moisture content of anywhere from 40 to 50%. This material contains the long fibers themselves containing a great amount of pith as well as the separated pith particles and is fed along a chute 10 to a scalper screen 11 having a 1" or 1½" mesh. The material too large to pass through the screen is collected and sold as a by-product for use, namely, in the manufacture of insulating wall board. This by-product represents about 60 or 70% of the bagasse as it is received from the mill, and contains essentially more of the long particles of rind fibers (having less pith) than does the material passing through the screen, as will be apparent to anyone having knowledge of the structure of sugar cane.

The screenings from the 1" or 1½" mesh screen which now contain more pith in relation to fiber than did the whole mass leaving the expressors 6 and 7 fall on a conveyor 12 which carries them to a feed hopper 13 into a flash drying oven 14, which may be mounted for rotation about its axis, as is common in devices of this kind. The heat for the oven 14 is provided by a furnace 15, preferably fired by valve controlled fuel burners 16. The burners 16 may be thermostatically or manually controlled so that the hot gases from the furnace propel the conglomerate mass through the oven 14 which is maintained at an inlet temperature never below 1800° F., and averaging about 2000° F.

The material thus fed into the oven, and having a moisture content of from 40 to 50% as already described, is suddenly exposed to such an extremely high temperature that steam is formed within the cells not previously disrupted by pressure and causes these cells to explode and/or expand in volume. It is to be noted that due to the cellular density of the fiber, which is much greater than the density of the pith or center portion, the explosion or the effects thereof will not be so much apparent in the fiber as in the pith or center portion.

When the product emerges from the dryer, all of the surface moisture has been eliminated therefrom, and the total moisture content is essentially less than 10%. A suction fan 17 draws the dry product out of the oven 14, and serves as a blower to blow the material up a stack 18 and into a cyclone separator 19, where the gases escape. The solid material remaining appears to be thoroughly exploded and/or expanded and is very fluffy. This solid material is directed onto an agitating table 20, having two screens 21 and 22 forming essential parts thereof.

The upper screen 21 has a mesh of 3½ to the inch, while the lower screen 22 has a mesh of ten to the inch. The material which falls onto the 3½ mesh screen and which does not pass therethrough, is conveyed by an endless conveyor 23 to a shredder 24. The material which passes onto the 10 mesh screen 22 and does not go through it constitutes a portion of the bedding or litter which forms the subject matter of this application. This material comprises 35% to 45% of the composite bedding material. The bedding or litter is directed from the space between the two screens 21 and 22 onto an endless conveyor 25 from which it may be removed and packed for commercial use.

The material that does go through the 10 mesh screen 22 is quite fine, and is used for explosives and flours. This is a by-product, which is not included in the poultry litter and animal bedding, directed onto the conveyor 25. The material rejected by the screen 21 and fed by the endless conveyor 23 into the shredder 24 is directed onto the agitator table 26, provided with the 10 mesh screen 27. The rejects of this screen also form part of the poultry litter and bedding and are directed from this screen 27 onto the conveyor 25 to mix with the material fed from the space on the agitating table 20 between the screens 21 and 22.

The material which passes through the screen 27 is directed from the agitator table 26 to mix with the material which passed through the 10 mesh screen and forms the by-product resulting from the operation of the agitator table 20 and which is used for making a product for use in the manufacture of explosives and for a stock feed.

The removal of this by-product leaves the remaining material as a dry, loose, bulky absorbent mass of selected portions of suger cane pulp free from dust and containing the pith cells of sugar cane which have been exploded and/or expanded during the process described. The pith cells being exploded and/or expanded have a specific gravity in the finished product materially less than the specific gravity of the pith cells in the original sugar cane stalk. The pith cells so exploded are obviously present in the finished material in larger volumetric percentages with respect to the fibers than are present in the sugar cane stalk.

It will be apparent that in my bedding material, I retain as much of the pith present in the extracted sugar cane stalks as possible, exploding the pith cells to increase their porosity and reduce their specific gravity, and therefore, increase the absorptive quality of the same. I actually retain in my product pith in greater proportion to fibers than the original proportion contained in the whole bagasse coming from the cane mills. I have found that this pith will absorb over eight times its weight of moisture whereas the fibers will only absorb 2½ times their weight of moisture. Therefore, the pith is most essential to my product.

I have found that the addition of sulphur compounds, such as atomized sulphuric acid under pressure, lowers the pH of the product, and causes a chemical reaction with my product, which gives it properties for destroying certain organisms causing fatal poultry diseases, thus making it antiseptic in its use as a litter. The sulphuric acid impregnated in my product may have a wide range of percentages depending on the original pH of the material before the addition of this chemical and on the final pH or acidity desired. The object of these additions of sulphur compounds is to render the material active as a deterrent to coccidiosis, which is a disease extremely fatal to poultry; also in the control of other diseases fatal to poultry, such as the following disease-producing organisms: *Bacterium coli, Salmonella pullorum* (B. W. D.), *Bacterium gallinarum* (fowl typhoid), and *Eimeria avian* (coccidiosis); also to maintain the litter in a more sterile condition after it has been spread for usage on the floors of poultry houses.

The word "pulp" as used in this specification and in the claims is intended to include both the fibre and pith cells; that is, the selected portion of the whole residue of the sugar cane stalk, as specified in the process outlined in the application.

What I claim is:

1. A bedding material for poultry and animals consisting of a dry, loose, bulky, absorbent mass of fibers free from dust, derived from bagasse and mixed with exploded pith cells of sugar cane.

2. A bedding material for poultry and animals consisting of a dry, loose, bulky, absorbent mass of fibers, derived from bagasse and mixed with exploded pith cells of sugar cane.

3. A bedding material for poultry and animals consisting of a dry, loose, bulky, absorbent mass of fibers, derived from bagasse and mixed with exploded pith cells of sugar cane, the specific gravity of the pith in the finished product being materially less than the specific gravity of the said pith in the sugar can stalk, and the volumetric proportion of said pith with respect to the fiber, being greater than exists in the whole mass of the sugar cane bagasse from which said material is derived.

4. A bedding material for poultry and animals consisting of a dry, loose, bulky, absorbent mass of exploded pith cells of sugar cane having a specific gravity less than that of the unexploded pith, and mixed with fiber derived from bagasse, said exploded pith and fiber having substantially a greater volumetric proportion of pith to fiber than is normally present in the sugar cane stalk.

5. A bedding material for poultry and animals consisting of a dry, loose, bulky, absorbent mass of sugar cane pulp free from dust, derived from bagasse and containing exploded pith cells of sugar cane mixed with the fibers of sugar cane pulp.

6. A bedding material for poultry and animals consisting of a dry, loose, bulky, absorbent mass of sugar cane pulp free from dust, derived from bagasse and containing exploded pith cells of sugar cane mixed with the fibers of sugar cane pulp, the specific gravity of the pith in the finished product being materially less than the specific gravity of the said pith in the sugar cane stalk, and the volumetric proportion of said pith with respect to the fiber, being greater than exists in the whole mass of sugar cane bagasse from which said material is derived.

7. A bedding material for poultry and animals consisting of a dry loose, bulky, absorbent mass of exploded pith cells of sugar cane having a specific gravity materially less than that of the unexploded pith, and mixed with fibers derived from bagasse and free from dust, the said exploded pith cells and fibers having substantially a greater volumetric proportion of pith to fiber than normally is present in the sugar cane stalk.

8. A bedding material for poultry and animals consisting of a dry, loose, bulky, absorbent mass of sugar cane pulp free from dust, derived from bagasse and containing exploded pith cells of sugar cane mixed with the fibers of sugar cane pulp to which have been added sufficient quantities of sulphuric acid and/or sulphur compounds to cause a chemical reaction with this product, rendering it more acid than normal and making it antiseptic in nature so that it becomes an active deterrent to poultry disease-organisms, such as *Bacterium coli, Salmonella pullorum* (B. W. D.), *Bacterium gallinarum* (fowl typhoid), and *Eimeria avian* (coccidiosis).

9. A bedding material for poultry and animals consisting of a dry, loose, bulky, absorbent mass of sugar cane pulp free from dust, derived from bagasse and containing exploded pith cells of sugar cane mixed with the fibers of sugar cane pulp, the specific gravity of the pith in the finished product being materially less than the specific gravity of the said pith in the sugar cane stalk, and the volumetric proportion of said pith with respect to the fiber, being greater than exists in the whole mass of sugar cane bagasse from which said material is derived, to which have been added sufficient quantities of sulphuric acid and/or sulphur compounds to cause a chemical reaction with this product, rendering it more acid than normal and making it antiseptic in nature so that it becomes an active deterrent to poultry disease-organisms, such as *Bacterium coli, Salmonella pullorum* (B. W. D.), *Bacterium gallinarum* (fowl typhoid), and *Eimeria avian* (coccidiosis).

10. A bedding material for poultry and animals consisting of a dry, loose, bulky, absorbent mass of exploded pith cells of sugar cane having a specific gravity materially less than that of the unexploded pith and mixed with fibers derived from bagasse and free from dust, the said exploded pith cells and fibers having substantially a greater volumetric proportion of pith to fiber than normally is present in the sugar cane stalk, to which have been added sufficient quantities of sulphuric acid and/or sulphur compounds to cause a chemical reaction with this product, rendering it more acid than normal and making it antiseptic in nature so that it becomes an active deterrent to poultry disease-organisms, such as *Bacterium coli, Salmonella pullorum* (B. W. D.), *Bacterium gallinarum* (fowl typhoid), and *Eimeria avian* (coccidiosis).

11. A bedding material for poultry and animals consisting of a dry, loose, bulky, absorbent mass of fibers, derived from bagasse said fibers mixed with exploded pith cells of sugar cane, the specific gravity of the pith in the finished product being materially less than the specific gravity of the said pith in the sugar cane stalk, and the volumetric and quantitative proportions of said pith with respect to the fiber, being greater than exist in the whole mass of the sugar cane bagasse from which said material is derived.

12. A bedding material for poultry and animals consisting of a dry, loose, bulky, absorbent mass of exploded pith cells of sugar cane having a specific gravity less than that of the unexploded pith, mixed with fiber derived from bagasse, said exploded pith and fiber having substantially greater volumetric and quantitative proportions of pith to fiber than are normally present in the sugar cane stalk.

13. A bedding material for poultry and animals consisting of a dry, loose, bulky, absorbent mass of sugar cane pulp free from dust, derived from bagasse and containing exploded pith cells of sugar cane mixed with the fibers of sugar cane pulp, the specific gravity of the pith in the finished product being materially less than the specific gravity of the said pith in the sugar cane stalk, and the volumetric and quantitative proportions of said pith with respect to the fiber, being greater than exist in the whole mass of sugar cane bagasse from which said material is derived.

14. A bedding material for poultry and animals consisting of a dry, loose, bulky, absorbent mass of exploded pith cells of sugar cane having a specific gravity materially less than that of the unexploded pith, and mixed with fibers derived from bagasse and free from dust, the said exploded pith cells and fibers having substantially greater volumetric and quantitative proportions of pith to fiber than normally are present in the sugar cane stalk.

15. A bedding material for poultry and animals consisting of a dry, loose, bulky, absorbent mass of sugar cane pulp free from dust, derived from bagasse and containing exploded pith cells of sugar cane mixed with the fibers of sugar cane pulp, the specific gravity of the pith in the finished product being materially less than the specific gravity of the said pith in the sugar cane stalk, and in volumetric and quantitative proportions greater than exist in the whole mass of sugar cane bagasse from which said material is derived, to which have been added sufficient quantities of sulphuric acid and/or sulphur compounds to cause a chemical reaction with this product, rendering it more acid than normal and making it antiseptic in nature so that it becomes an active deterrent to poultry disease-organisms, such as *Bacterium coli, Salmonella pullorum* (B. W. D.), *Bacterium gallinarum* (fowl typhoid), and *Eimeria avian* (coccidiosis).

16. A bedding material for poultry and animals consisting of a dry, loose, bulky, absorbent mass of exploded pith cells of sugar cane having a specific gravity materially less than that of the unexploded pith and mixed with fibers derived from bagasse and free from dust, the said exploded pith cells and fibers having substantially greater volumetric and quantitative proportions of pith to fiber than normally are present in the sugar cane stalk, to which have been added sufficient quantities of sulphuric acid and/or sulphur compounds to cause a chemical reaction with this product, rendering it more acid than normal and making it antiseptic in nature so that it becomes an active deterrent to poultry disease-organisms, such as *Bacterium coli, Salmonella pullorum* (B. W. D.), *Bacterium gallinarum* (fowl typhoid), and *Eimeria avian* (coccidiosis).

WALTER GODCHAUX.